United States Patent
Mulchandani (10) Patent No.: US 9,760,716 B1
(45) Date of Patent: Sep. 12, 2017

(54) PROCESS RISK CLASSIFICATION (71) Applicant: Accenture Global Services Limited, Dublin (IE)

(72) Inventor: Shaan Mulchandani, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 15/589,517

(22) Filed: May 8, 2017

Related U.S. Application Data (63) Continuation of application No. 14/838,712, filed on Aug. 28, 2015.

(60) Provisional application No. 62/171,887, filed on Jun. 5, 2015.

(51) Int. Cl.
*G06F 21/57* (2013.01)
*G06F 21/52* (2013.01)
*G06F 21/56* (2013.01)

(52) U.S. Cl.
CPC ............ *G06F 21/577* (2013.01); *G06F 21/52* (2013.01); *G06F 21/566* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,528,513 A | 6/1996 | Vaitzblit et al. | |
| 7,219,347 B1 | 5/2007 | Waddington et al. | |
| 7,669,087 B1 | 2/2010 | Johnsen | |
| 7,779,410 B2 | 8/2010 | Gebhart et al. | |
| 8,171,545 B1 | 5/2012 | Cooley et al. | |
| 8,505,102 B1 | 8/2013 | Cannings et al. | |
| 9,348,999 B2 | 5/2016 | Sugaya et al. | |
| 2002/0156644 A1 | 10/2002 | Davies et al. | |
| 2003/0009744 A1 | 1/2003 | Doyle et al. | |
| 2008/0270213 A1 | 10/2008 | Christodoulou et al. | |
| 2009/0165131 A1 | 6/2009 | Treadwell | |
| 2009/0165133 A1 | 6/2009 | Hwang et al. | |

(Continued)

OTHER PUBLICATIONS

International Search Report and Written Opinion in International Application No. PCT/IB2016/052463, mailed Jul. 8, 2016, 11 pages.

*Primary Examiner* — Michael R Vaughan
(74) *Attorney, Agent, or Firm* — Fish & Richardson P.C.

(57) ABSTRACT

In one implementation, a computer-implemented method includes receiving, at a process risk classifier running on a computer system, a request to determine a risk level for a particular process; accessing one or more signatures that provide one or more snapshots of characteristics of the particular process at one or more previous times; identifying one or more differences between the particular process in its current form and the one or more signatures; accessing information identifying previous usage of the computer system's resources by the particular process; determining a current risk score for the particular process based, at least in part, on (i) the one or more signatures for the particular process, (ii) the one or more differences between the particular process in its current form and the one or more signatures, and (iii) the previous usage of the resources; and providing the current risk score for the particular process.

20 Claims, 6 Drawing Sheets

(56) References Cited

U.S. PATENT DOCUMENTS

| | | |
|---|---|---|
| 2009/0276783 A1 | 11/2009 | Johnson |
| 2009/0282474 A1* | 11/2009 | Chen ................. G06F 21/53 |
| | | 726/21 |
| 2009/0292570 A1 | 11/2009 | Fawls et al. |
| 2009/0328209 A1 | 12/2009 | Nachenberg |
| 2011/0067008 A1 | 3/2011 | Srivastava et al. |
| 2012/0005115 A1 | 1/2012 | Hofberg et al. |
| 2013/0254885 A1 | 9/2013 | Devost |
| 2013/0268257 A1 | 10/2013 | Hu et al. |
| 2013/0283373 A1 | 10/2013 | Zisapel et al. |
| 2014/0278733 A1 | 9/2014 | Sabharwal |
| 2014/0308919 A1 | 10/2014 | Baranov |
| 2015/0101049 A1 | 4/2015 | Lukacs et al. |
| 2015/0199521 A1 | 7/2015 | Bobzin et al. |
| 2015/0205961 A1* | 7/2015 | Franklin ............. G06F 21/56 |
| | | 726/11 |
| 2015/0302184 A1 | 10/2015 | Kargman et al. |
| 2016/0147564 A1 | 5/2016 | Marr et al. |
| 2016/0224380 A1 | 8/2016 | Wang et al. |
| 2016/0357967 A1 | 12/2016 | Mulchandani |

* cited by examiner

PROCESS RISK CLASSIFICATION

CROSS-REFERENCE TO RELATED APPLICATIONS

This application is a continuation (and claims the benefit of priority under 35 USC 120) of U.S. application Ser. No. 14/838,712, filed Aug. 28, 2015, which claims the benefit of U.S. Provisional Application No. 62/171,887, filed Jun. 5, 2015, and titled "Process Risk Classification." Both of these prior applications are incorporated by reference in their entirety.

TECHNICAL FIELD

This document generally describes technology related to classifying computer processes based on risk.

BACKGROUND

Computer applications (e.g., web browser applications, browser-based applications, thin client applications, stand-alone applications) that are run on computing devices (e.g., laptop computers, desktop computers, mobile computing devices, computer systems) by one or more processors can include any number of computer processes that are executed by the one or more processors to provide the applications. For example, a web browser application may include separate processes that are executed and communicate with each other to retrieve, render, and output web pages, such as web pages that use one or more browser plugins.

Computer processes that are executed on a computer may pose security risks, such as the processes making unwanted changes on the computer (e.g., permission changes, data corruption, network settings modifications) and/or unauthorized accessing of sensitive information (e.g., private user information, financial information). A variety of security mechanisms have been used to minimize the potentially negative effects of such computer processes, such as sandboxing processes (running processes in isolated environment), running processes on virtual machines (emulation of a computing environment), using antivirus software, implementing various network firewalls, using encryption for stored information, and using certificates to authenticate permission of various operations.

SUMMARY

This document generally describes determining and classifying risks that are posed by computer processes. For example, potential risks that are posed by computer processes can be assessed and quantified based on a variety of factors, such process signatures, process dependencies, and/or computer resource usage (e.g., CPU use, memory use, network traffic). Process risks can additionally and/or alternatively be determined based on changes related to processes over time, such as changes in process signatures, changes process dependencies, and/or changes in resource usage. Risk scores can be generated dynamically for processes, such as when processes are instantiated and/or during runtime.

In one implementation, a computer-implemented method includes receiving, at a process risk classifier running on a computer system, a request to determine a risk level for a particular process; accessing, by the process risk classifier, one or more signatures for the particular process that provide one or more snapshots of characteristics of the particular process at one or more previous times; identifying, by the process risk classifier, one or more differences between the particular process in its current form and the one or more signatures for the particular process; accessing, by the process risk classifier, information identifying previous usage of the computer system's resources by the particular process; determining, by the process risk classifier, a current risk score for the particular process based, at least in part, on (i) the one or more signatures for the particular process, (ii) the one or more differences between the particular process in its current form and the one or more signatures, and (iii) the previous usage of the resources; and providing, by the process risk classifier, the current risk score for the particular process.

Such a computer-implemented method can optionally include one or more of the following features. The computer-implemented method can further include obtaining, at the process risk classifier, information that identifies current usage of the computer system's resources by the particular process; and comparing, by the computer system, the current usage of the resources with the previous usage of the resources. The current risk score can be determined further based, at least in part, on the current usage of the resources and the comparison of the current usage with the previous usage of the resources. The request can be received during runtime of the particular process on the computer system from a process manager that is programmed to manage process risk for processes running on the computer system. The request can include information that identifies requested usage of the computer system's resources by the particular process. The method can further include comparing, by the computer system, the requested usage of the resources with the previous usage of the resources. The current risk score can be determined further based, at least in part, on the requested usage of the resources and the comparison of the requested usage with the previous usage of the resources. The request can be received in response to the particular process requesting permission to run on the computer system. The request can be received in response to the particular process requesting additional resources during runtime.

The computer-implemented method can further include receiving, at the process risk classifier, an indication that the process is newly installed on the computer; determining, by the process risk classifier, an initial signature for the process following installation; and storing, by the process risk classifier, the initial signature in association with the process. The one or more signatures can include the initial signature. The computer-implemented method can further include determining, in response to the request, a second signature for the process; and storing, by the process risk classifier, the second signature, and the deviation between the first and second signatures, in association with the process. The one or more signatures can further include the second signature.

The computer-implemented method can further include accessing, by the process risk classifier, one or more dependency maps for the particular process that identify one or more dependencies for the particular process. The current risk score can be further determined based on the one or more dependencies for the particular process. The one or more dependency maps can include a tree data structure that represents process dependencies for the particular process and other processes installed on computer system. The tree data structure can be a B+ tree. The current risk score can be determined based on which of one or more paths from the tree data structure.

The particular process can be one of a plurality of processes that includes an application installed on the computer system. The particular process can be an application installed on the computer system. The previous usage of the resources can correspond to previous usage of one or more processors for the computer system by the particular process. The previous usage of the resources can correspond to previous usage of memory for the computer system by the particular process. The previous usage of the resources can correspond to previous network traffic on the computer system by the particular process. The previous usage of the resources can correspond to previous energy consumption on the computer system by the particular process. The previous usage of the resources can correspond to previous processing threads on the computer system by the particular process.

In another implementation, a computer system includes one or more processors; one or more storage devices; a particular process including one or more executable files stored in the one or more storage devices, the one or more executable files being programmed to be executed by the one or more processors; and a process risk classifier that is programmed to: receive a request to determine a risk level for the particular process, access one or more signatures for the particular process that provide one or more snapshots of characteristics of the particular process at one or more previous times, identify one or more differences between the particular process in its current form and the one or more signatures for the particular process, access information identifying previous usage of the computer system's resources by the particular process, determine a current risk score for the particular process based, at least in part, on (i) the one or more signatures for the particular process, (ii) the one or more differences between the particular process in its current form and the one or more signatures, and (iii) the previous usage of the resources, and provide the current risk score for the particular process.

Certain implementations may provide one or more advantages. For example, process risks can be more accurately and efficiently determined, which can improve overall system performance. In another example, by using multiple different factors process risks can be assessed in a more dynamic and robust manner, which can improve overall computer security. For instance, risks can be accurately assessed without relying on, for example, enumerated lists of potentially risky processes.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document generally describes techniques, systems, program products, and computing devices for assessing risks that are posed by computer processes, such as processes that are part of a computer application. Process risk can be determined based on any of a number of appropriate factors, such as process signatures, process dependencies, and/or resource usage. For example, a first process that uses a minimal amount of a computer system's resources when it runs and that has had a low level of variation in its resource usage over time, may be determined to have a low risk score indicating a low probability that the first process currently poses a security risk. However, a second process that has recently had a large increase in resources usage (e.g., large increase in memory usage, network traffic, CPU usage) can be determined to have a relatively higher risk score that indicates a high probability that the second process is currently a security risk on the computer system. Such risk scores may be used by the computer system to determine how to best manage the first and second processes, such as isolating the second process while allowing the first process to be executed normally (without isolation).

Figure 1A:
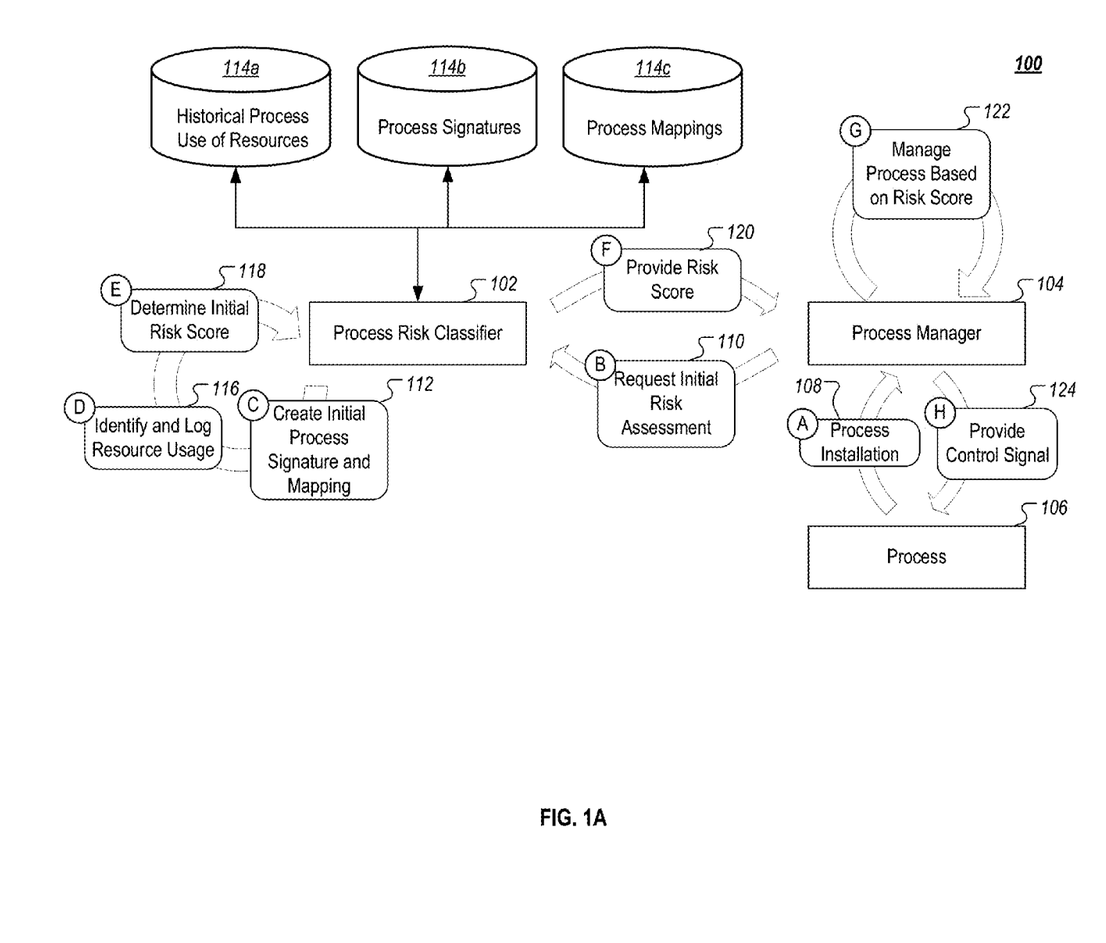
FIGS. 1A-B is a conceptual diagram of an example computer system for determining process risks.
Figure 1B:
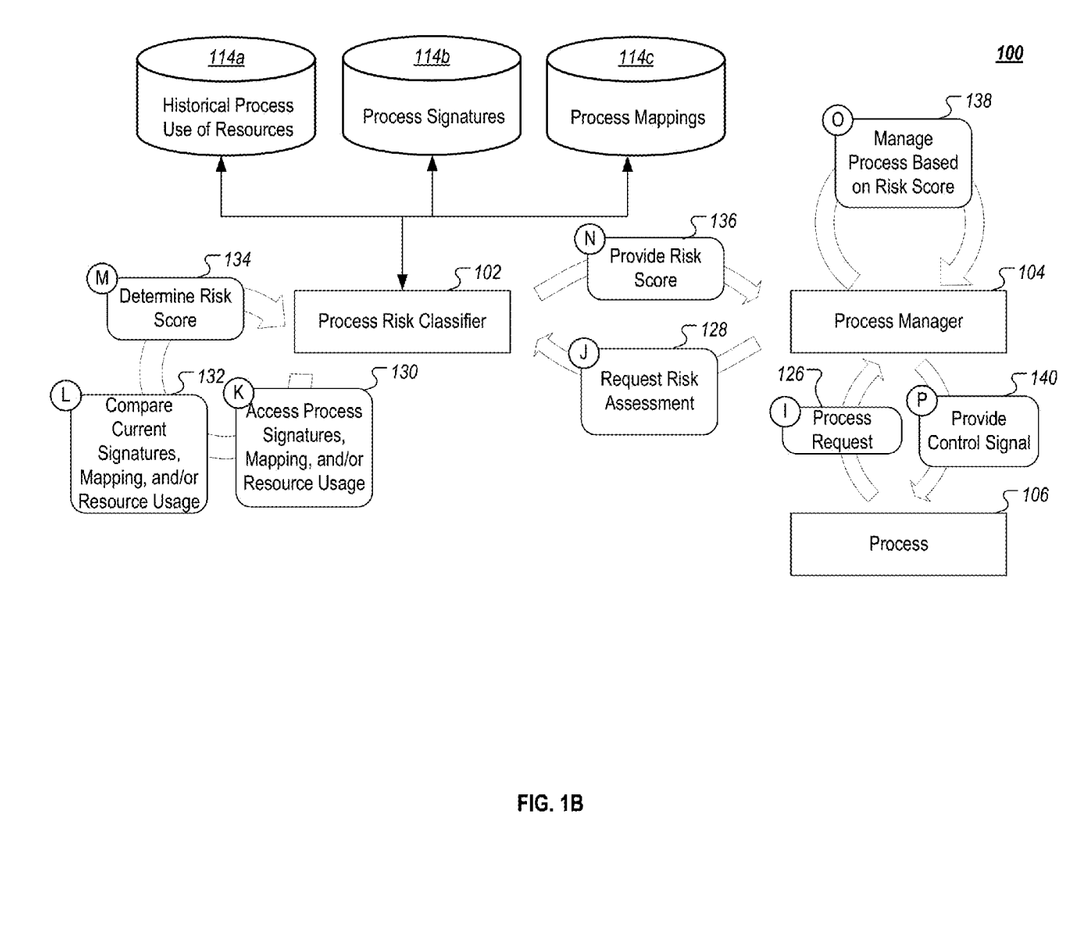

FIGS. 1A-B are a conceptual diagram of an example computer system 100 for determining process risks. The example computer system 100 can be any of a variety of computing environments, including individual computing devices (e.g., laptop computers, desktop computers, mobile computing devices, wearable computing device, computer server) and/or networked groups of computing devices (e.g., server system, cloud computing system, client-server system). The computer system 100 includes an example process risk classifier 102 that is programmed to classify risks posed by processes on the computer system 100, an example process manager 104 that is programmed to manage the execution of processes on the computer system 100 based on risk scores determined by the process risk classifier 102, and an example process 106 on the computer system 100.

Referring to FIG. 1A, the computer system 100 can determine an initial baseline for the process 106 when it is installed on the computer system 100. The initial baseline can include information such as process signatures, dependency mappings, and resource usage for the process 106. The baseline can be used to detect changes to the process 106 over time, such as increased usage of resources, changes in the dependency mapping, and/or changes in the signature for the process, which may indicate that something has happened to the process (e.g., modified by another process, infected with a virus or other malicious code) to cause it to pose an increased or decreased risk to the computer system 100.

As indicated by step A (108), an indication that the process 106 has been installed on the computer system 100 can be provided to the process manager 104. The process manager 104 can be configured on the computer system 100 to receive such notification, such as through event handlers registered with the operating system for the computer system 100. In some implementations, the process manager 104 is a process itself that is running on the computer system 100 between the process 106 and an operating system on the computer system 100. In other implementations, the process manager 104 is a subcomponent of the operating system for the computer system 100. Other implementations of the process manager 104 are also possible, such as processor and/or other chip-based implementations.

In response to receiving the information indicating that the process 106 (which may be an application itself, or a sub-process that is part of an application) has been installed on the computer system 100, the process manager 104 can provide a request to the process risk classifier 102 for initial risk assessment of the process 106, as indicated by step B (110). Like the process manager 104, the process risk classifier 102 can be implemented in any of a variety of ways, such as a process itself, as part of another process (e.g., subcomponent of the process manager 104), as part of the operating system on the computer system 100, chip/processor-based implementations, and/or other appropriate implementations. The process manager 104 and/or the process risk classifier 102 can be implemented in software (e.g., standalone process, application process, operating system component), hardware (e.g., application specific integrated circuit (ASIC), processor modules), firmware, or any combination thereof.

In response to receiving the request from the process manager 104, the process risk classifier 102 can create an initial process signature and an initial dependency mapping, as indicated by step C (112). One or more process signatures can be determined by the process risk classifier 102 for the process 106, such as one or more hashes of the process 106 (e.g., one or more hashes of the executable file(s)), hashes of other information associated with the process 106 (e.g., filename, timestamp, permissions, owner (e.g., users, namespaces)), and/or amounts of resources (e.g., CPU usage, memory usage, threads) that are requested and/or used by the process 106. For example, while requested and/or used resources may not be exactly identical across instances of the process 106, they can be baselined to provide an indication of anomalies. In some instances, multiple different functions can be used to hash the process 106 and/or associated information to establish a filter (e.g., Bloom filter) that can be used to identify changes in the process 106 from its initial installation.

The process risk classifier 102 can create a mapping of dependencies for the process 106, for example, using an execution order for the process 106, if such information exists and is available. Any of a variety of data structures can be used to model the depending mapping, such as a tree structure (e.g., B+ tree). A single data structure can be used across all processes/applications on the computer system 100, and/or separate data structures can be used for individual processes/applications. The dependency mapping information can be used to readily assess whether the process 106 extends along one or more paths that pose greater or lesser risks to the computer system 100. Dependency mappings can be continuously updated/refined as more processes are run, and/or variations of the same process are run (e.g. same process being run on different architectures and/or under different namespaces). Various machine learning algorithms can be used to implement a learning functionality/mechanism for updating/refining dependency mappings.

The computer system 100 can include one or more data repositories 114a-c (e.g., databases) that are used by the process risk classifier 102 to assess process risk. A first example data repository 114a can store historical resource usage information for the process 106 and other processes on the computer system 100. The second example data repository 114b can store process signatures for the process 106 and other processes on the computer system 100. The third example data repository 114c can store process mappings (e.g., dependency mappings) for the process 106 and other processes on the computer system 100. The process mappings that are stored may include a single process mapping for all processes on the system 100 and/or individual mappings for processes and/or applications.

The process risk classifier 102 can store the initial process signature(s) in the process signature data repository 114b in association with time information (e.g., timestamps, dates) when the process signature(s) were generated. The process risk classifier 102 can maintain a history of process signatures for the process 106 over time, which can be used to determine whether the process 106 has changed over time and to what extent.

The process risk classifier 102 can also store the dependency mapping in the process mappings data repository 114c. The dependency mapping may include time information as well (e.g., timestamps, dates) and different time-based versions of the dependency mapping so that changes in the process dependencies overtime can be determined.

As indicated by step D (116), the process risk classifier 102 can identify and log resource usage for the process 106. Such resource usage can include recent and current resource usage by the process 106 (e.g., current runtime resource usage, resource usage over a past period of time (e.g., past second, past minute), as well as resource usage requested by the process 106 (e.g., memory allocation requested, network traffic transmission requests). Usage of any of a variety of resources can be determined and tracked, such as processor/CPU utilization (e.g., processor cycles used), memory utilization (e.g., allocated memory), network traffic (e.g., traffic ingress and/or egress), energy consumption (e.g., energy consumption from processor operations, memory operations, and output operations), numbers of process threads, output device usage (e.g., display, speakers, haptic feedback devices), input device monitoring (e.g., keyboard, voice input, motion-based input), subsystem usage (e.g., CPU, graphics card usage, sensor usage), and/or other appropriate metrics. The process risk classifier 102 can log resource usage information for the process 106 in the historical resource usage data repository 114a in association with time information (e.g., timestamp, date), which can be used to identify changes in resource usage over time.

The process risk classifier 102 can determine an initial risk score for the process 106, as indicated by step E (118). The initial score can be determined based on a variety of factors, such as the process signatures, dependency mapping, and resource usage for the process 106, as determined in steps C and D. A risk score can be provided over a range of values (e.g., 0.0-1.0; 0-100; A-F) that, at one end, indicates a process with low/no risk (e.g., risk score of 0) and at the other end indicates a process with high risk (e.g., risk score 1.0 or 100). A low/no risk score may represent, for example, a process that does not pose any risk, such as the state of an operating system when it is initially installed on the computer system 100. Such a process may be permitted, by the process manager 104, to operate without limitation or isolation. In contrast, a high risk score may represent a process that poses great risk to the security of the computer system 100, such as a process that is infected with a virus or a malware process. The process manager 104 may take any of a variety of steps to protect itself against such processes running on the computer system 100, such as isolating the processes and/or prohibiting them from running at all.

The process risk classifier 102 can use any of a variety of techniques to determine the risk score. For example, the process risk classifier 102 can start with a default score for the process 106, such as a middle score (e.g., score of 50 for risk scores ranging from 0-100), and then increase or decrease the score as indicators of risk or safety (no risk) are presented through risk assessment information (e.g., signatures, mappings, resource usage) for the process 106. For example, a dependency mapping that shows the process 106 not going down any paths that present potential risks could decrease the risk score (e.g., drop the risk score from 50 to 40) and low resource usage could decrease the risk score further (e.g., decrease risk score from 40 to 20). In another example, dependency mappings showing the process 106 using paths with moderate risks could increase the score (e.g., increase from 50 to 55) and anomalous resource usage (e.g., requesting all of available of RAM) could increase the score as well (e.g., increase from 55 to 75).

A variety of additional and/or alternative factors can be used by the risk classifier 102 to determine the risk score. For example, risk can be inversely proportional to the number of times the process 106 has been executed, time window of executions, and/or the number of users who have executed the process 106. For example, if 100 people (large number of users) have run the process 106 every day for years (long time window and large number of executions) with little to no deviation in signature/characteristics/attributes, the process 106 can be determined to have a low risk score (e.g., risk score closer to 0 than 100) indicating that the process 106 is relatively safe.

The process risk classifier 102 can provide the risk score to the process manager 104, as indicated by step F (120), which can then manage the process based on the risk score, as indicated by step G (122). Such process management can include a variety of possibilities ranging from relinquishing the process for execution by the operating system (e.g., in a default, non-isolated namespace) to blocking execution of the process 106. As indicated by step H (124), the process manager 104 can provide a control signal (e.g., to the operating system, to the process 106) to manage the process 106, which can cause execution of the process 106 to proceed according to the management determined based on the risk score.

Referring to FIG. 1B, risk assessment of the process 106 at a later point in time after installation of the process 106 is depicted. The example steps that are depicted in FIG. 1B are, in some instances, similar to the steps that are depicted in FIG. 1A. At a time after installation of the process 106, the process can provide a request to the process manager 104, as indicated by step I (126). For example, the request can be made in any of a variety of contexts, such as a request for the process to run/be executed on the computer system 100 (e.g., in response to a user providing input to run the process 106 and/or an application of which the process 106 is a part) and/or a request for resources (e.g., additional memory allocation) that is made during runtime by the process 106.

Similar to step B, the process manager 104 can provide a request for a risk assessment of the process 106 in response to receiving the request, as indicated by step J (128). In response to receiving the request, the process risk classifier 102 can access signatures, mappings, and/or historical resource usage for the process 106 from the data repositories 114*a-c*, as indicated by step K (130). The process risk classifier 102 can then determine current signatures, mappings, and resource usage for the process 106, as described above with regard to steps C and D, and can compare that current information against the accessed/historical information for the process 106, as indicated in step L (132). Such comparisons can involve detecting differences between the current process information and the historical information, which can indicate increased and/or decreased risks for the process 106. The processor risk classifier 102 can use any of a variety of techniques to perform the comparison, such as filter techniques (e.g., Bloom filter), B+ trees, and/or binary diff operations to determine degrees of similarity between the current and previous values.

The process risk classifier 102 can use the comparisons and/or the current process information (e.g., signatures, mapping, resource usage) to determine a risk score for the process 106 at a current time (e.g., at or around the time the request was made to the process manager 104), as indicated by step M (134). The risk score can be determined in a similar manner to the initial risk score discussed above with regard to step E. For example, the process risk classifier 102 may start with a default score (e.g., mid-point score) and can increase/decrease the value based on indicators of risk and safety (no risk). For example, significant deviations between the current process information and the previous/historical information, such as one or more current signatures for the process 106 not matching one or more previous/historical signatures for the process 106, can indicate an increased risk for the process 106. Similarly, the current resource usage for the process 106 having increased over previous/historical resource usage (e.g., average resource usage over a recent window of time, average resource usage over all time) may also be an indicator of increased risk. Risk factors can additionally/alternatively be identified at step M without comparison to previous/historical information, similar to the techniques described above with regard to step E. Other factors can additionally and/or alternatively be used to determine risk scores, such as number of times the process 106 has been executed, time window of executions, and/or the number of users who have executed the process 106, as described above.

The process risk classifier 102 can provide the risk score to the process manager 104, as indicated by step N (136), which can manage the process based on the risk score, as indicated by step O (138), and provide a control signal, as indicated by step P (140). The steps N-P can be similar to the steps F-H described above.

Although not depicted in the specific example in FIGS. 1A-B, the process manger 104 can request risk assessments from the process risk classifier 102 on its own and without having first received a request from the process 106. For example, the process manager 104 can continuously make requests of the process risk classifier 102 during runtime of the process 106. In another example, the process manager 104 can periodically (e.g., daily, weekly, in response to particular events) make such requests to the process risk classifier 102. The process risk classifier 102 may be programmed to continuously and/or periodically determine risk scores for processes without being instructed to do so by the process manager 104 and, in response to a request, may provide a risk score that was most recently determined for the process at issue.

Figure 2:
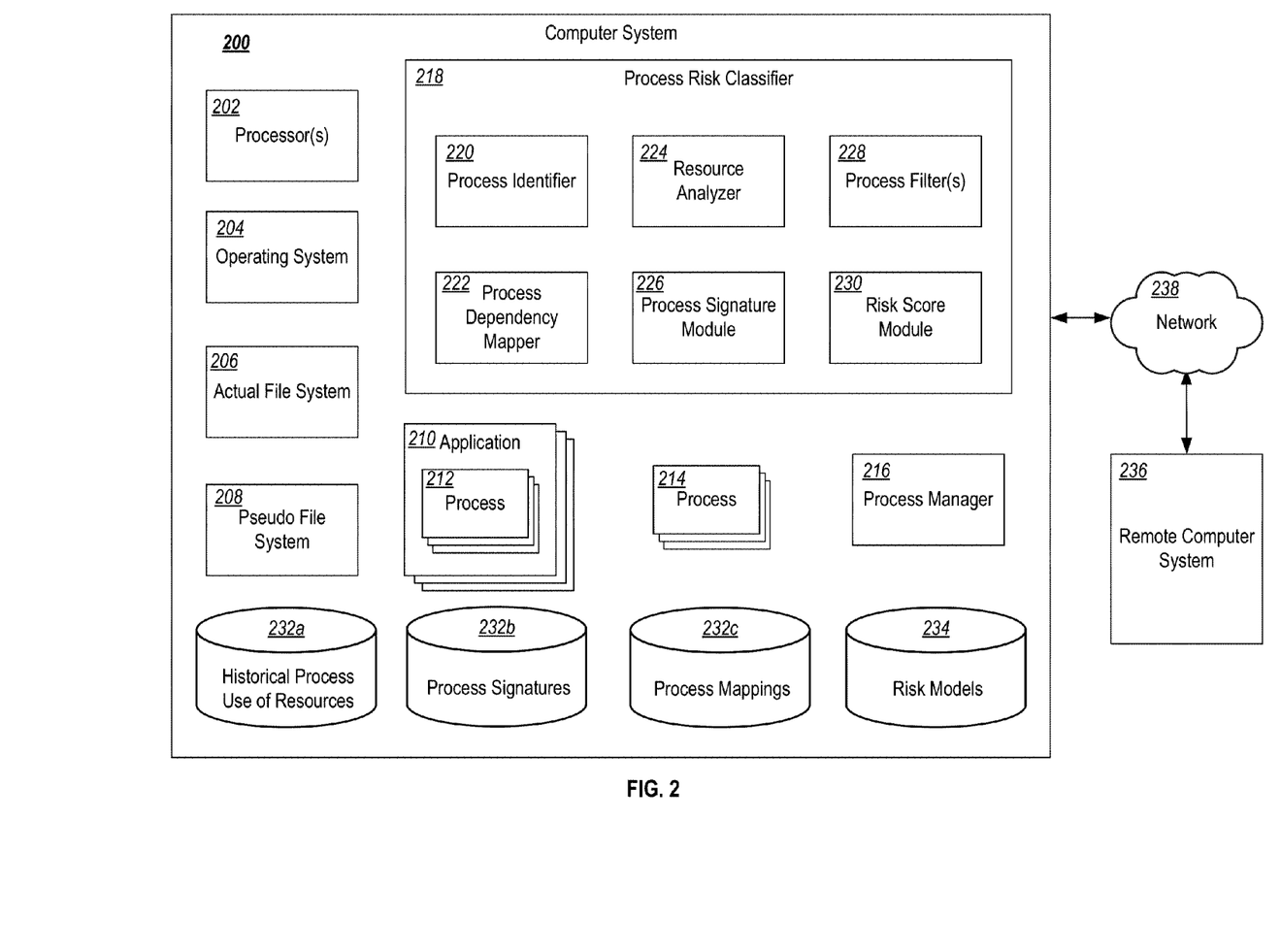
FIG. 2 depicts an example computer system for assessing process risk.

FIG. 2 depicts an example computer system 200 for assessing process risk. The example system 200 can be similar to the system 100 described above with regard to FIGS. 1A-B. For example, the computer system 200 can perform steps A-P and can be any of a variety of appropriate computer systems, such as individual computing devices (e.g., laptops, desktop computers, mobile computing devices, computer server) and/or networked computing devices (e.g., server system, cloud-based computer system, client-server system).

The computer system 200 includes one or more processors 202 and an operating system 204 for the computer system 200 that is run using the processors 202 to provide a computing environment on the computer system 200. The computer system 200 can include an actual file system 206 that can store files that are in a native namespace used by the processors 202 and the operating system 204. The computer system 200 can also include a pseudo file system 208 that can be in a separate namespace that is different and isolated from the native namespace for the computer system 200.

The pseudo file system 208 can be used for running potentially risky processes so that, if they do include malicious and/or harmful code, it will not negatively impact the actual file system 206. The computer system 200 also includes a plurality of applications 210, that can each one or more processes 212, as well as standalone processes 214 (e.g., utility processes). The processes 212 and 214 can be similar to the process 106 described above with regard to FIGS. 1A-B.

A process manager 216 and a process risk classifier 218 are also included in the computer system 200. The process manager 216 and the process risk classifier 218 are similar to the process manager 104 and the process risk classifier 102, respectively, as described above with regard to FIGS. 1A-B. For example, the process manager 216 can provide requests for risk assessments for the processes 212/214 to the process risk classifier 218, which can determine and provide current risk scores for the processes 212/214, and the process manager 216 can manage the processes 212/214 based on the risk scores. For instance, the process manager 216 can use the risk scores to determine whether to use the actual file system 206 or the pseudo file system 208 for execution of the processes 212/214.

The process risk classifier 218 includes a process identifier 220 that is programmed to identify processes (e.g., identify instantiated processes that are running on the computer system 200) that are identified in requests for risk assessments and to identify corresponding process information from data repositories 232*a-c*, which can be similar to the repositories 114*a-c*, respectively.

The process risk classifier 218 can include a process dependency mapper 222 that can map dependencies for the processes 212/214, which can be stored in the process mappings data repository 232*c*. The process dependency mapper 222 can perform operations similar to those discussed above with regard to steps C, K, and L.

The process risk classifier 218 additionally includes a resource analyzer 224 that can determine resource usage (current and/or requested) by the processes 212/214, and can determine changes in resource usage over time through the use of the information in the historical resource data repository 232*a*. The resource analyzer 224 can perform operations similar to those discussed above with steps D, K, and L. The resource analyzer 224 can additionally monitor resource usage by the processes 212/214 and can log the information in the historical resource usage data repository 232*a*, which can be used to detect changes in resource usage over time.

A process signature module 226 can also be included in the process risk classifier 218. The process signature module 226 can determine signatures for the processes 212/214, such as using any of a variety of hash functions on the executables for the processes 212/214, on information associated with the processes 212/214 (e.g., filename, owner, permissions, timestamps), and/or information associated with the applications 210. The process signature module 226 can perform operations similar to those described above with regard to C, K, and L.

The process risk classifier 218 can additionally include one or more process filters 228 that can be programmed to be applied to determine whether the processes 212/214 have changed over time from the previous instances (e.g., initial installation, earlier instantiations of the processes 212/214). For example, the process filters 228 can include B+ trees, binary diff operations, and/or other appropriate techniques to provide information identifying relative degrees of similarity that can be applied to process signatures to determine whether the processes 212/214 have changed from an earlier form.

The process risk classifier 218 further includes a risk score module 230 that is programmed to determine risk scores for the processes 212/214 based on the any of a variety of factors, such as those identified by one or more of the components 220-228 and/or based on information stored in the data repositories 232*a-c*. The risk score module 230 can perform operations similar to those described above with regard to steps E and M. The risk score module 230 can additionally determine risk scores based on risk models that are stored in a risk model repository 234. Risk models can include a variety of information to assist in determining risk scores, such as weighting information that identifies weights (e.g., score increase amount for particular factors, score decrease amount of other particular factors) that should be applied based on various factors.

The risk models in the repository 234 can be updated and refined over time, for example, based on the retrospective accuracy of previous risk scores. For example, if a particular process received a low risk score but was found to have compromised security on the computer system 200 (e.g., transmitting sensitive information to another computing device), then the computer system 200 can reexamine and revise models that were used to determine the incorrectly low risk score for the particular process. Any of a variety of mechanisms can be used to determine such models and model revisions, such as machine learning algorithms (e.g., neural networks, decision trees) that can take a variety of disparate factors to determine corresponding models. The risk score module 230 can periodically reevaluate and update the risk models 234 based on evaluation of the determined risk scores and the actual risks that were presented by the processes 212/214.

The risk score module 230 can additionally leverage and incorporate models that are used by other computer systems. For example, the risk score module 230 can obtain risk models from other computer systems, such as the remote computer system 236 over a network 238 (e.g., the internet, wireless networks, wired networks, or any combination thereof), which can be incorporated, in whole or in part, into the risk model repository 234. Additionally and/or alternatively, the risk score module 230 can provide information to the remote computer system 236 regarding determined risk scores and the corresponding accuracy of the risk scores, and the remote computer system 236 can combine that information with similar information from multiple other computer systems to determine risk models that leverage data from a broader group of computer systems. The remote computer system 236 can then provide such risk models back to the computer system 200, which can use and incorporate them into the risk model repository 234. The information shared with the remote computer system 236 may be anonymized by the computer system 200 and may be provided only with user consent so as to protect user privacy. Additionally, the remote computer system 236 may be authenticated and certified by the computer system 200 as a trusted source for risk model information before the risk model information is incorporated into and used as part of the risk model repository 234.

Although one of each of the systems 200 and 236 is described, multiples of each of the systems 200 and 236 are possible. Additionally, the modules and components described for the system 200 can be implemented in any of a variety of ways, such as through software (e.g., applications, operating system process), hardware (e.g., ASIC), firmware, or any combination thereof.

Figure 3A:
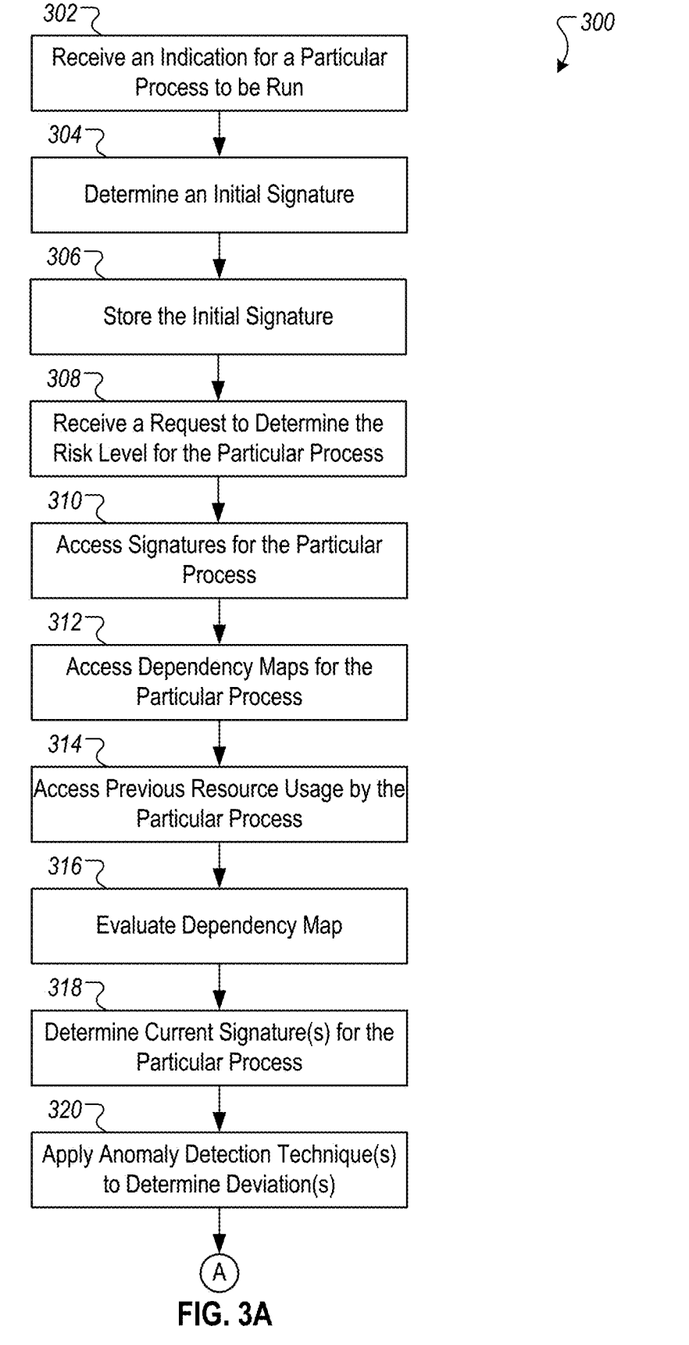
FIGS. 3A-B are flowcharts of an example technique for assessing risks posed by computer processes.
Figure 3B:
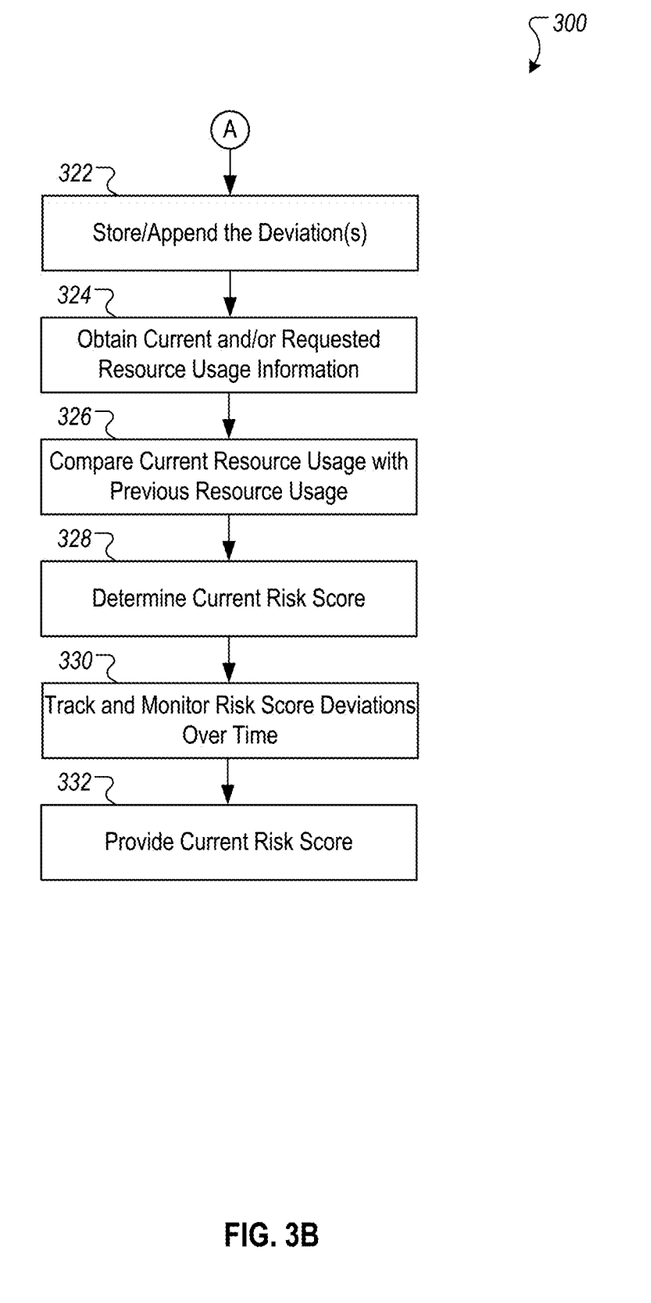

FIGS. 3A-B are flowcharts of an example technique 300 for assessing risks posed by computer processes. The example technique 300 can be performed by any of a variety of appropriate computer systems and/or computing devices, such as the computer system 100 and/or the computer system 200.

Referring to FIG. 3A, a request is received for a particular process to be run (302). For example, the process risk classifier 218 can receive an indication that one or more of the processes 212/214 has been requested to be run (e.g., requested by a user, requested by another process, requested following installation/update). The indication can prompt the process risk classifier 218 to determine baseline information for the processes to be run, which can be used to assess changing risks posed by the processes over time (e.g., as a result of changes to the processes over time). Determining such baseline information can include determining one or more initial signatures for the recently installed processes (304), storing the signature information (306), mapping and storing dependencies information of the processes, and determining and storing initial resource usage information for the processes.

After establishing baseline information, a request to determine the risk level of the particular process can be received (308). For example, the process risk classifier 218 can receive a request from the process manager 216. In response to receiving the request, previously determined signatures for the particular process can be accessed (310), dependency mappings for the particular process can be accessed (312), and previous/historical resource usage information for the particular process can be accessed (314). For example, the resource analyzer 224 can access historical resource usage from the repository 232a, the process signature module 226 can access signatures for the process from the repository 232b, and the process dependency mapper 22 can access process mappings from the repository 232c. Using this accessed information, the dependency map can be evaluated (316). For example, the process dependency mapper 222 can examine the branches of the map that are occupied by the particular process and/or can identify changes in the branches of the map for the particular process to identify risk factors for the particular process.

One or more current signatures for the particular process can be determined (318). One or more anomaly detection techniques can be performed to determine differences/deviations between stored and observed information for the particular process (320). For example, differences between the current/observed signatures/characteristics/attributes and the stored signatures/characteristics/attributes can be determined. For instance, the process signature module 226 can determine current/observed signatures for a process and can determine whether anomalies exist in the current process based, for example, on differences between the current/observed and stored signatures, such as through use of the process filters 228, to identify risk factors for the particular process.

Referring to FIG. 3B, deviations between stored and observed information for the particular process can be stored/appended (322). For example, the process signature module 226 can store differences between the current/observed signature/characteristics/attributes and the stored signature/characteristics/attributes in the process signatures repository 232b. Current and/or requested resource usage information can be obtained (324) and compared against previous resource usage information (326). For example, the resource analyzer 224 can obtain current and/or requested resource usage information for the processes 212/214, and can compare it against historical resource usage information from the historical resource usage repository 232a to identify one or more risk factors for the processes 212/214.

Current risk scores can be determined (328) and deviations in risk scores can be continuously tracked and monitored over time (330). For example, the system administration process or similar process can continuously monitor risk scores for deviations that may indicate risks associated with the current/observed form of the particular process. The current risk scores and/or deviations in risk scores can be provided (332). For example, a current risk score for a particular process can be determined by the risk score module 230 based on any number of factors, such as the current dependency map for the particular process, a change in the dependency map for the particular process, current signatures for the particular process, changes in the signatures for the particular process, current and/or requested resource usage for the particular process, changes in the resources used by the particular process, or any combination thereof. The risk score module 230 can provide the determined risk score to other components that may use the risk score, such as the process manager 216.

Figure 4:
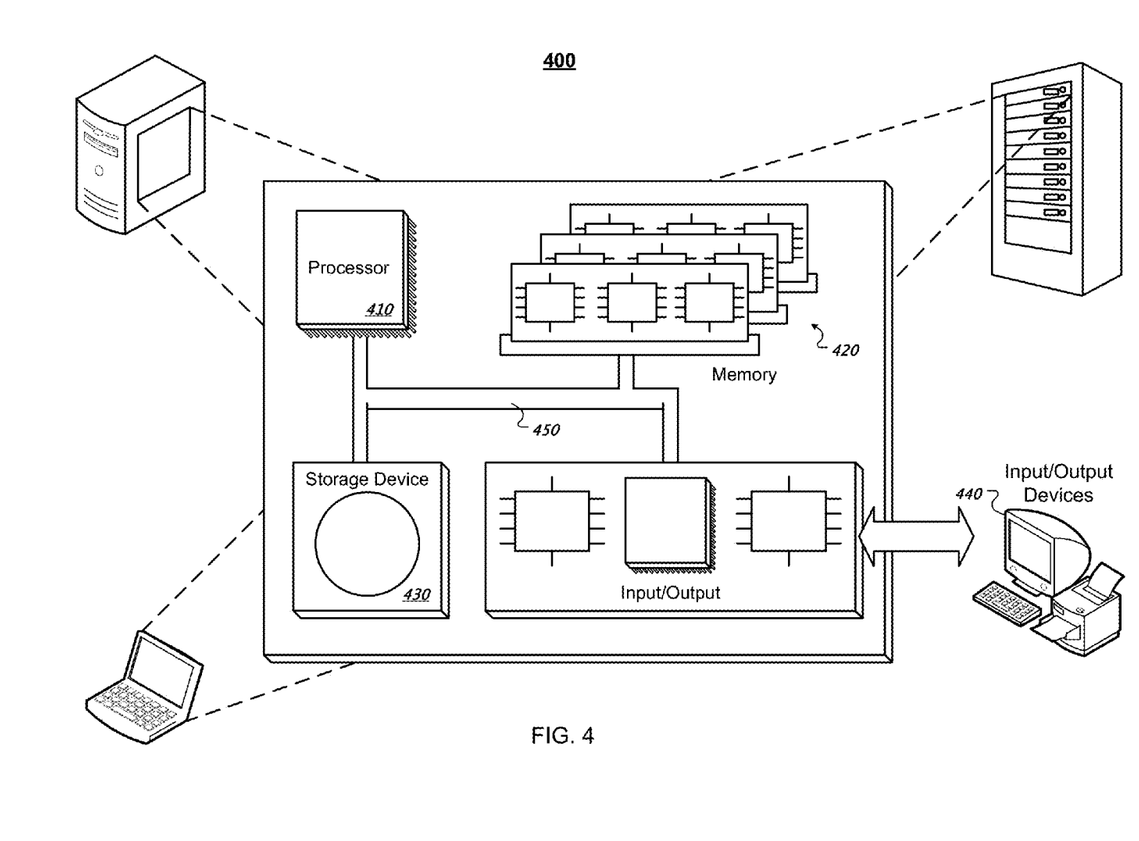
FIG. 4 illustrates a schematic diagram of an exemplary generic computer system.

FIG. 4 illustrates a schematic diagram of an exemplary generic computer system. The system 400 can be used for the operations described in association with the processes 300 according to some implementations.

The system 400 includes a processor 410, a memory 420, a storage device 430, and an input/output device 440. Each of the components 410, 420, 430, and 420 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method comprising:
obtaining (i) a set of one or more initial features that are associated with an initial execution of a particular process, and (ii) a set of one or more subsequent features that are associated with a subsequent execution of a particular process;
providing (i) the set of one or more initial features that are associated with an initial execution of a particular process, and (ii) the set of one or more subsequent features that are associated with a subsequent execution of a particular process, to a process risk classifier that is trained, based on (i) a given set of one or more initial features that are associated with an initial execution of a given process and (ii) a given set of one or more subsequent features that are associated with a subsequent execution of a given process, to output a risk score that quantifies an estimated amount of risk associated with the given process;
in response to providing (i) the set of one or more initial features that are associated with an initial execution of a particular process, and (ii) the set of one or more subsequent features that are associated with a subsequent execution of a particular process, receiving, from the process risk classifier, a particular risk score that quantifies an estimated amount of risk associated with the particular process; and
selectively placing the subsequent or later executions of the particular process in an isolating computing environment based at least on the particular risk score that quantifies the estimated amount of risk associated with the particular process.

2. The method of claim 1, wherein the set of one or more initial features associated with the initial execution of the particular process and the set of one or more subsequent features associated with the subsequent execution of the particular process comprise an indication of an amount of processor usage during the initial and subsequent executions, respectively.

3. The method of claim 1, wherein the set of one or more initial features associated with the initial execution of the particular process and the set of one or more subsequent features associated with the subsequent execution of the particular process comprise an indication of an amount of memory usage during the initial and subsequent executions, respectively.

4. The method of claim 1, wherein the set of one or more initial features associated with the initial execution of the particular process and the set of one or more subsequent features associated with the subsequent execution of the particular process comprise an indication of an amount of an amount of network usage during the initial and subsequent executions, respectively.

5. The method of claim 1, wherein the set of one or more initial features associated with the initial execution of the particular process and the set of one or more subsequent features associated with the subsequent execution of the particular process comprise an indication of other processes that are associated with initial and subsequent executions, respectively.

6. The method of claim 1, wherein the set of one or more initial features associated with the initial execution of the particular process and the set of one or more subsequent features associated with the subsequent execution of the particular process comprise data characterizing user inputs received during the initial and subsequent executions, respectively.

7. The method of claim 1, wherein the set of one or more initial features associated with the initial execution of the particular process and the set of one or more subsequent features associated with the subsequent execution of the particular process comprise an indication of an amount of energy usage associated with a particular hardware component during the initial and subsequent executions, respectively.

8. A system comprising:
one or more computers; and
one or more storage devices storing instructions that are operable, when executed by the one or more computers, to cause the one or more computers to perform operations comprising:
obtaining (i) a set of one or more initial features that are associated with an initial execution of a particular process, and (ii) a set of one or more subsequent features that are associated with a subsequent execution of a particular process;
providing (i) the set of one or more initial features that are associated with an initial execution of a particular process, and (ii) the set of one or more subsequent features that are associated with a subsequent execution of a particular process, to a process risk classifier that is trained, based on (i) a given set of one or more initial features that are associated with an initial execution of a given process and (ii) a given set of one or more subsequent features that are associated with a subsequent execution of a given process, to output a risk score that quantifies an estimated amount of risk associated with the given process;
in response to providing (i) the set of one or more initial features that are associated with an initial execution of a particular process, and (ii) the set of one or more subsequent features that are associated with a subsequent execution of a particular process, receiving, from the process risk classifier, a particular risk score that quantifies an estimated amount of risk associated with the particular process; and
selectively placing the subsequent or later executions of the particular process in an isolating computing environment based at least on the particular risk score that quantifies the estimated amount of risk associated with the particular process.

9. The system of claim 8, wherein the set of one or more initial features associated with the initial execution of the particular process and the set of one or more subsequent features associated with the subsequent execution of the particular process comprise an indication of an amount of processor usage during the initial and subsequent executions, respectively.

10. The system of claim 8, wherein the set of one or more initial features associated with the initial execution of the particular process and the set of one or more subsequent features associated with the subsequent execution of the particular process comprise an indication of an amount of memory usage during the initial and subsequent executions, respectively.

11. The system of claim 8, wherein the set of one or more initial features associated with the initial execution of the particular process and the set of one or more subsequent features associated with the subsequent execution of the particular process comprise an indication of an amount of an amount of network usage during the initial and subsequent executions, respectively.

12. The system of claim 8, wherein the set of one or more initial features associated with the initial execution of the particular process and the set of one or more subsequent features associated with the subsequent execution of the particular process comprise an indication of other processes that are associated with initial and subsequent executions, respectively.

13. The system of claim 8, wherein the set of one or more initial features associated with the initial execution of the particular process and the set of one or more subsequent features associated with the subsequent execution of the particular process comprise data characterizing user inputs received during the initial and subsequent executions, respectively.

14. The system of claim 8, wherein the set of one or more initial features associated with the initial execution of the particular process and the set of one or more subsequent features associated with the subsequent execution of the particular process comprise an indication of an amount of energy usage associated with a particular hardware component during the initial and subsequent executions, respectively.

15. A non-transitory computer readable storage device storing instructions that, when executed by one or more processors, cause the one or more processors to perform operations comprising:
  obtaining (i) a set of one or more initial features that are associated with an initial execution of a particular process, and (ii) a set of one or more subsequent features that are associated with a subsequent execution of a particular process;
  providing (i) the set of one or more initial features that are associated with an initial execution of a particular process, and (ii) the set of one or more subsequent features that are associated with a subsequent execution of a particular process, to a process risk classifier that is trained, based on (i) a given set of one or more initial features that are associated with an initial execution of a given process and (ii) a given set of one or more subsequent features that are associated with a subsequent execution of a given process, to output a risk score that quantifies an estimated amount of risk associated with the given process;
  in response to providing (i) the set of one or more initial features that are associated with an initial execution of a particular process, and (ii) the set of one or more subsequent features that are associated with a subsequent execution of a particular process, receiving, from the process risk classifier, a particular risk score that quantifies an estimated amount of risk associated with the particular process; and
  selectively placing the subsequent or later executions of the particular process in an isolating computing environment based at least on the particular risk score that quantifies the estimated amount of risk associated with the particular process.

16. The device of claim 15, wherein the set of one or more initial features associated with the initial execution of the particular process and the set of one or more subsequent features associated with the subsequent execution of the particular process comprise an indication of an amount of processor usage during the initial and subsequent executions, respectively.

17. The device of claim 15, wherein the set of one or more initial features associated with the initial execution of the particular process and the set of one or more subsequent features associated with the subsequent execution of the particular process comprise an indication of an amount of memory usage during the initial and subsequent executions, respectively.

18. The device of claim 15, wherein the set of one or more initial features associated with the initial execution of the particular process and the set of one or more subsequent features associated with the subsequent execution of the particular process comprise an indication of an amount of an amount of network usage during the initial and subsequent executions, respectively.

19. The device of claim 15, wherein the set of one or more initial features associated with the initial execution of the particular process and the set of one or more subsequent features associated with the subsequent execution of the particular process comprise an indication of other processes that are associated with initial and subsequent executions, respectively.

20. The device of claim 15, wherein the set of one or more initial features associated with the initial execution of the particular process and the set of one or more subsequent features associated with the subsequent execution of the particular process comprise data characterizing user inputs received during the initial and subsequent executions, respectively.

* * * * *

UNITED STATES PATENT AND TRADEMARK OFFICE
CERTIFICATE OF CORRECTION

PATENT NO. : 9,760,716 B1  
APPLICATION NO. : 15/589517  
DATED : September 12, 2017  
INVENTOR(S) : Shaan Mulchandani Page 1 of 1

It is certified that error appears in the above-identified patent and that said Letters Patent is hereby corrected as shown below:

In the Claims

Claim 4, Column 15, Lines 51-52, delete "of an amount of an amount of" and insert -- of an amount of --, therefor.

Claim 11, Column 16, Lines 63-64, delete "of an amount of an amount of" and insert -- of an amount of --, therefor.

Claim 18, Column 18, Lines 28-29, delete "of an amount of an amount of" and insert -- of an amount of --, therefor.

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*